(12) United States Patent
Patil et al.

(10) Patent No.: US 11,041,418 B2
(45) Date of Patent: Jun. 22, 2021

(54) TECHNIQUES FOR DETERMINING CONDENSATION ACCUMULATION AND DEPLETION AT A CHARGE AIR COOLER OF A TURBOCHARGED ENGINE HAVING A LOW PRESSURE COOLED EGR SYSTEM

(71) Applicants: Nikhil Patil, Auburn Hills, MI (US); Sangeeta Theru, Troy, MI (US); Ethan E Bayer, Lake Orion, MI (US)

(72) Inventors: Nikhil Patil, Auburn Hills, MI (US); Sangeeta Theru, Troy, MI (US); Ethan E Bayer, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 70 days.

(21) Appl. No.: 16/664,057

(22) Filed: Oct. 25, 2019

(65) Prior Publication Data

US 2020/0157989 A1    May 21, 2020

Related U.S. Application Data

(60) Provisional application No. 62/768,247, filed on Nov. 16, 2018.

(51) Int. Cl.
*F01N 3/00* (2006.01)
*F01N 3/02* (2006.01)
(Continued)

(52) U.S. Cl.
CPC .......... *F01N 3/005* (2013.01); *F01N 3/0205* (2013.01); *F02B 27/0205* (2013.01); *F02B 29/0468* (2013.01); *F02B 29/0493* (2013.01)

(58) Field of Classification Search
CPC .... F01N 3/005; F01N 3/0205; F02B 27/0205; F02B 29/0468; F02B 29/0493;
(Continued)

(56) References Cited

U.S. PATENT DOCUMENTS 9,145,823 B2    9/2015  Glugla et al.
9,267,423 B2    2/2016  Russ et al.
(Continued)

FOREIGN PATENT DOCUMENTS

FR    3064678 A1    10/2018

OTHER PUBLICATIONS

International Search Report and Written Opinion dated Feb. 3, 2020, International Application No. PCT/US2019/061349, International Filing Date Nov. 14, 2019.

*Primary Examiner* — Audrey K Bradley
*Assistant Examiner* — Dapinder Singh
(74) *Attorney, Agent, or Firm* — Ralph E Smith (57) ABSTRACT

Turbocharged engine water vapor ingestion control techniques determine a dew point of a charge air cooler (CAC) in an induction system of the engine based on measured humidity and temperature of a mixture of (i) air drawn into the induction system and (ii) exhaust gas produced by the engine that is cooled and recirculated by a low pressure cooled exhaust gas recirculation (LPCEGR) system of the engine back into the induction system. When the mixture temperature is less than the CAC dew point, a condensate accumulation in the CAC is determined. When the CAC condensate accumulation does not satisfy a set of one or more thresholds, the mixture temperature is increased. When the CAC condensate accumulation satisfies the set of one or more thresholds, an amount of the exhaust gas that is cooled and recirculated by the LPCEGR system is decreased until the mixture temperature meets the CAC dew point.

16 Claims, 4 Drawing Sheets

(51) Int. Cl.
*F02B 27/02* (2006.01)
*F02B 29/04* (2006.01)

(58) Field of Classification Search
CPC ...... F02B 29/04; F02B 37/001; F02B 37/007; F02D 41/0065; F02D 41/0007; F02D 2200/0418; F02D 2200/0414; F02M 26/06; F02M 26/33; Y02T 10/12; Y02T 10/40
USPC ................................ 60/280, 320, 602, 605.2
See application file for complete search history.

(56) References Cited

U.S. PATENT DOCUMENTS

| | | | |
|---|---|---|---|
| 9,435,251 | B2 | 9/2016 | Surnilla et al. |
| 9,488,152 | B2 | 11/2016 | Glugla et al. |
| 9,617,909 | B2 | 4/2017 | Styles et al. |
| 9,879,626 | B1 * | 1/2018 | Mavalankar ....... F02M 35/1038 |
| 9,890,691 | B2 | 2/2018 | Banker et al. |
| 9,938,914 | B2 | 4/2018 | Brinkmann et al. |
| 2009/0050117 | A1 * | 2/2009 | Tai ...................... F02B 29/0412 123/542 |
| 2014/0102424 | A1 * | 4/2014 | Norman ................. F02B 29/04 123/542 |
| 2014/0102428 | A1 * | 4/2014 | Fulton ................ F02B 29/0468 123/568.12 |
| 2014/0190160 | A1 * | 7/2014 | Styles ................... F02M 26/10 60/602 |
| 2014/0244136 | A1 | 8/2014 | Leone et al. |
| 2017/0114738 | A1 * | 4/2017 | Hoard ................. F02M 25/028 |

* cited by examiner

TECHNIQUES FOR DETERMINING CONDENSATION ACCUMULATION AND DEPLETION AT A CHARGE AIR COOLER OF A TURBOCHARGED ENGINE HAVING A LOW PRESSURE COOLED EGR SYSTEM

CROSS-REFERENCE TO RELATED APPLICATION(S)

The present U.S. Non-Provisional Application claims the benefit of U.S. Provisional Application No. 62/768,247, filed on Nov. 16, 2018. The disclosure of the above-referenced application is incorporated herein by reference in its entirety.

FIELD

The present application generally relates to exhaust gas recirculation (EGR) and, more particularly, to techniques for determining condensation accumulation and depletion at a charge air cooler of a turbocharged engine having a low pressure, cooled EGR system.

BACKGROUND

Exhaust gas recirculation (EGR) involves recirculating at least a portion of an exhaust gas produced by an engine back into an induction system of the engine. EGR is typically used to reduce nitrogen oxide (NOx) emissions, to reduce pumping losses and increase engine efficiency, and/or to reduce knock/auto-ignition. In a low pressure, cooled EGR (LPCEGR) system, exhaust gas is cooled and recirculated from a point after a turbocharger turbine and back into the induction system. The cooled exhaust gas is combined with fresh air to form an air/exhaust gas mixture (an "air charge") that is then pressurized by a turbine and further cooled by a charge air cooler (CAC). Condensation of the air charge occurs at the CAC, which could result in water being drawn into the engine by the air charge.

Ingestion of water by the engine could cause a variety of problems, such as cylinder-to-cylinder imbalance (e.g., engine knock), misfires, and potential damage to engine components (the CAC, the turbocharger compressor wheel, intake valves/valve seats, etc.). Conventional solutions to CAC condensation in engines having LPCEGR systems include installing a deflector shield below the CAC and/or installing a drain plug at the bottom of the CAC to prevent this water ingestion by the engine. These additional components increase costs. Furthermore, the engine is actually capable of ingesting a certain amount of condensation without any significant negative impact (reduced performance, potential component damage, etc.). Accordingly, while these conventional EGR systems do work well for their intended purpose, there exists an opportunity for improvement in the relevant art.

SUMMARY

According to one example aspect of the invention, a control system for a turbocharged engine having a low pressure cooled exhaust gas recirculation (LPCEGR) system and an induction system with a charge air cooler (CAC) is presented. In one exemplary implementation, the control system comprises: a set of one or more sensors configured to measure humidity and temperature of a mixture of (i) air drawn into the induction system and (ii) exhaust gas produced by the engine that is cooled and recirculated by the LPCEGR system back into the induction system, and a controller configured to: determine a dew point of the CAC based on the air/exhaust gas mixture humidity and temperature, and when the air/exhaust gas mixture temperature is less than the CAC dew point: determine a condensate accumulation in the CAC, when the CAC condensate accumulation does not satisfy a set of one or more thresholds, increase the air/exhaust gas mixture temperature, and when the CAC condensate accumulation satisfies the set of one or more thresholds, decrease an amount of the exhaust gas that is cooled and recirculated by the LPCEGR system until the air/exhaust gas mixture temperature meets the CAC dew point.

In some implementations, the controller is configured to determine the CAC dew point by: determining a partial pressure of water vapor at a turbocharger compressor inlet, determining a mass fraction of water vapor at the turbocharger compressor inlet based on the water vapor partial pressure, determining a total intake water vapor fraction at a current EGR fraction based on the water vapor mass fraction at the turbocharger compressor inlet, determining a water vapor fraction resulting from combustion based on the total intake water vapor fraction at the current EGR fraction, and determining the CAC dew point based on the water vapor fraction resulting from combustion.

In some implementations, the controller is further configured to determine a condensate production in the CAC and a CAC condensate depletion from the CAC based on (i) a velocity of the air/exhaust gas mixture, (ii) a blow off fraction indicative of a portion of the CAC condensate production that is depleted at a given air/exhaust gas mixture velocity, and (iii) capacity for condensate accumulation in the CAC. In some implementations, the controller is configured to determine the CAC condensate production by subtracting a saturated mass fraction of water vapor at the CAC the total intake water vapor fraction at the current EGR fraction.

In some implementations, the controller is configured to determine the CAC condensate accumulation by subtracting the CAC condensate depletion from the CAC condensate production. In some implementations, the controller is further configured to: set the blow off fraction equal to one when the CAC condensate accumulation exceeds the CAC condensate accumulation capacity, determine the CAC condensate depletion to be zero when the CAC condensate accumulation remains in excess of the CAC condensate accumulation capacity, and adjust the CAC condensate accumulation by subtracting the CAC condensate depletion from the CAC condensate accumulation when the CAC condensate accumulation falls below the CAC condensate accumulation capacity.

In some implementations, the CAC does not have a deflector shield or a drain plug for preventing or discarding at least some of the CAC condensate accumulation. In some implementations, the engine is a twin-turbocharged six cylinder engine.

According to another example aspect of the invention, a method of controlling ingestion of water vapor into a turbocharged engine having an LPCEGR system and an induction system with a CAC is presented. In one exemplary implementation, the method comprises: receiving, by a controller and from a set of one or more sensors, measured humidity and temperature of a mixture of (i) air drawn into the induction system and (ii) exhaust gas produced by the engine that is cooled and recirculated by the LPCEGR system back into the induction system, determining, by the controller, a dew point of the CAC based on the air/exhaust gas mixture humidity and temperature, and when the air/ exhaust gas mixture temperature is less than the CAC dew point: determining, by the controller, a condensate accumulation in the CAC, when the CAC condensate accumulation does not satisfy a set of one or more thresholds, increasing, by the controller, the air/exhaust gas mixture temperature, and when the CAC condensate accumulation satisfies the set of one or more thresholds, decreasing, by the controller, an amount of the exhaust gas that is cooled and recirculated by the LPCEGR system until the air/exhaust gas mixture temperature meets the CAC dew point.

In some implementations, determining the CAC dew point comprises: determining a partial pressure of water vapor at a turbocharger compressor inlet, determining a mass fraction of water vapor at the turbocharger compressor inlet based on the water vapor partial pressure, determining a total intake water vapor fraction at a current EGR fraction based on the water vapor mass fraction at the turbocharger compressor inlet, determining a water vapor fraction resulting from combustion based on the total intake water vapor fraction at the current EGR fraction, and determining the CAC dew point based on the water vapor fraction resulting from combustion.

In some implementations, the method further comprises determining, by the controller, a condensate production in the CAC and a CAC condensate depletion from the CAC based on (i) a velocity of the air/exhaust gas mixture, (ii) a blow off fraction indicative of a portion of the CAC condensate production that is depleted at a given air/exhaust gas mixture velocity, and (iii) capacity for condensate accumulation in the CAC. In some implementations, determining the CAC condensate production comprises subtracting a saturated mass fraction of water vapor at the CAC the total intake water vapor fraction at the current EGR fraction.

In some implementations, determining the CAC condensate accumulation comprises subtracting the CAC condensate depletion from the CAC condensate production. In some implementations, the method further comprises: set the blow off fraction equal to one when the CAC condensate accumulation exceeds the CAC condensate accumulation capacity, determine the CAC condensate depletion to be zero when the CAC condensate accumulation remains in excess of the CAC condensate accumulation capacity, and adjust the CAC condensate accumulation by subtracting the CAC condensate depletion from the CAC condensate accumulation when the CAC condensate accumulation falls below the CAC condensate accumulation capacity.

In some implementations, the CAC does not have a deflector shield or a drain plug for preventing or discarding at least some of the CAC condensate accumulation. In some implementations, the engine is a twin-turbocharged six cylinder engine.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, conventional low pressure, cooled exhaust gas recirculation (LPCEGR) systems for turbocharged engines implement additional componentry (deflector shields, drain plugs, etc.) at a charge air cooler (CAC) to avoid the engine ingesting condensation (i.e., water vapor). This additional componentry increases costs. Further, there is an acceptable amount of water vapor that can be ingested by the engine without a negative impact. Accordingly, techniques are presented that determine condensation accumulation and depletion at the CAC and control the engine accordingly without the implementation of additional componentry.

For LPCEGR applications, the EGR path is very long and thus it is difficult to track the water vapor throughout the EGR and intake loops. These techniques utilize a plurality of measured and modeled temperatures and pressures and measured humidity to estimate the amount of condensate produced for current operating conditions, the amount of condensate being ingested by the engine, and the amount of condensate remaining on the CAC housing. This generally involves a calibration using air velocity blow off fraction and a capacity of condensate accumulation. Finally, a target air charge temperature (ACT) and/or a target EGR is chosen to prevent or maintain desirable levels of CAC condensate accumulation. Potential benefits include, but are not limited to, increased fuel economy due to the ability to operate the engine over a wider range of ACT and EGR dilution levels.

Figure 1:
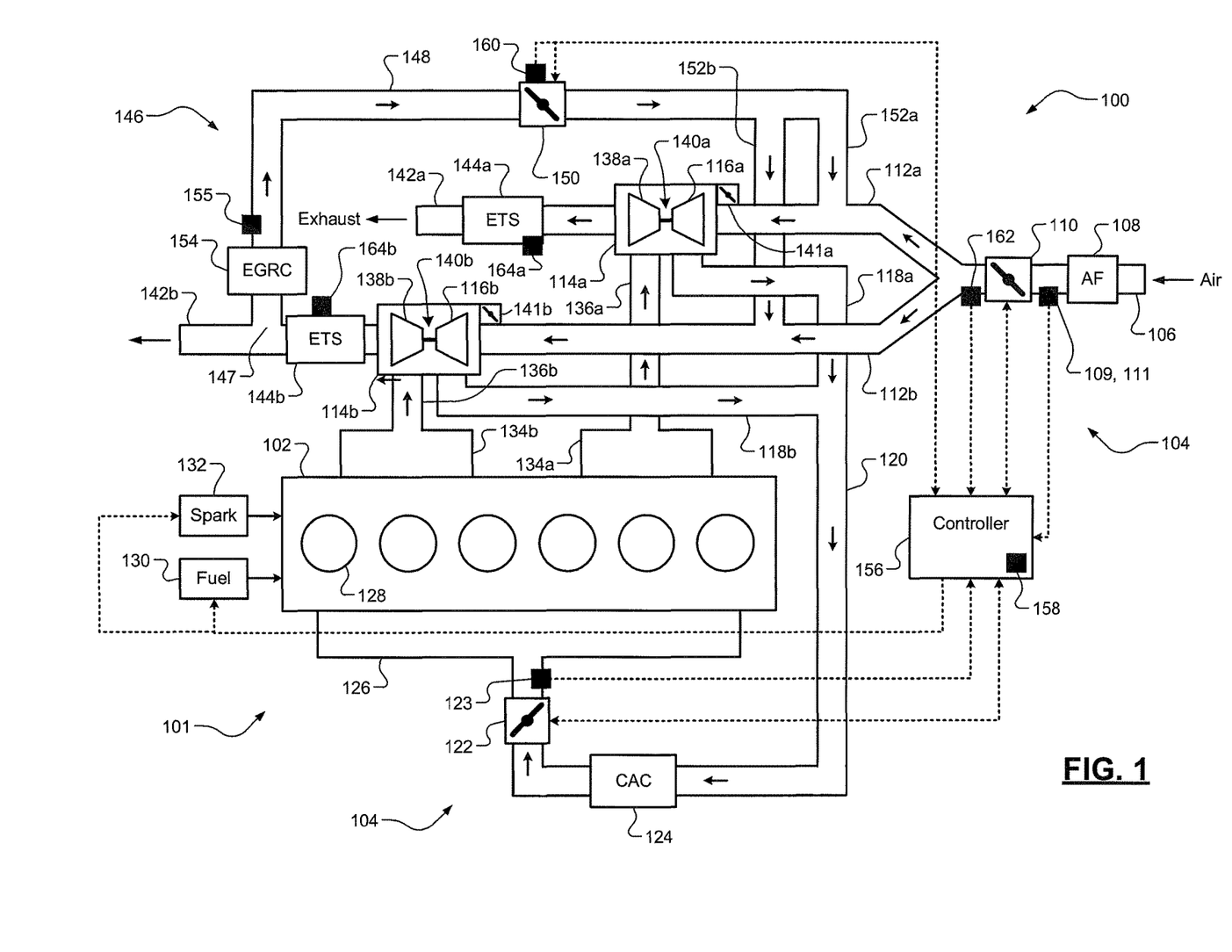
FIG. 1 is a diagram of an example vehicle having a turbocharged engine with a low pressure, cooled exhaust gas recirculation (LPCEGR) system according to the principles of the present disclosure.

Referring now to FIG. 1, an example engine system 101 for a vehicle or vehicle powertrain 100 is illustrated. The engine system 101 includes a gasoline engine 102 that receives air from an induction system 104. While a gasoline engine is specifically illustrated and discussed herein, it will be appreciated that the techniques of the present disclosure could also be applicable to diesel engines having LPCEGR systems. An induction path 106 receives fresh air that is filtered by an air filter (AF) 108. A differential pressure (dP) valve 110 regulates the flow of air through the induction path 106 and a pressure in induction paths 112a, 112b. Turbochargers 114a, 114b comprise compressors 116a, 116b ("compressors 116") that force air/exhaust gas from the induction paths 112a, 112b through induction paths 118a, 118b that converge into a single induction path 120.

While two turbochargers 114a and 114b are shown, it will be appreciated that the engine system 101 could have only one turbocharger and associated piping. A throttle valve 122 regulates the flow of air/exhaust gas through a CAC 124 and into an intake manifold 126. It will be appreciated that the throttle 122 could be implemented upstream from the CAC 124. The air/exhaust gas in the intake manifold 126 is provided to a plurality of cylinders 128, combined with gasoline from fuel injectors 130 and combusted by spark from spark plugs 132 to drive pistons (not shown) that generate drive torque to propel the vehicle 100. While six cylinders are shown, it will be appreciated that the engine 102 could include any suitable number of cylinders (4, 8, etc.). Exhaust gas resulting from combustion is expelled from the cylinders 128 into exhaust manifolds 134a, 134b.

Each exhaust manifold 134a, 134b, for example, could be associated with three of the six cylinders 128. The exhaust gas in exhaust manifold 134a flows through exhaust path 136a and its kinetic energy drives a turbine 138a of turbocharger 114a. The turbine 138a drives compressor 116a via a shaft 140a. Similarly, the exhaust gas in exhaust manifold 134b flows through exhaust path 136b and its kinetic energy drives a turbine 138b of turbocharger 114b, which in turn drives compressor 116b via a shaft 140b. Wastegate valves 141a, 141b regulate turbocharger speed/boost pressure. The exhaust gas flows from turbines 138a, 138b through exhaust paths 142a, 142b and is treated by exhaust treatment systems (ETS) 144a, 144b to decrease or eliminate emissions before being released into the atmosphere.

Non-limiting example components include gasoline particulate filters (GPFs), there-way catalytic converters (TWCs), and mufflers. It will be appreciated that each ETS 144a, 144b could include other exhaust treatment components. An LPCEGR system 146 recirculates exhaust gas from an EGR pickup point 147 downstream of ETS 144b through an EGR path 148 that is regulated by an EGR valve 150. The EGR path 148 splits into separate EGR paths 152a, 152b which direct the exhaust gas to ports in induction paths 112a, 112b downstream of the dP valve 110 and upstream of the compressors 116a, 116b. The LPCEGR system 146 also includes an EGR cooler (EGRC) 154 that cools the exhaust gas. Because turbocharged gasoline engines operate at very high temperatures, cooling of the recirculated exhaust gas could provide for increased performance.

A controller 156 controls operation of the engine system 101. It will be appreciated that the term "controller" as used herein refers to any suitable control device or set of multiple control devices that is/are configured to perform at least a portion of the techniques of the present disclosure. Non-limiting examples include an application-specific integrated circuit (ASIC) and one or more processors and a non-transitory memory having instructions stored thereon that, when executed by the one or more processors cause the controller to perform a set of operations. The one or more processors could be either a single processor or two or more processors operating in a parallel or distributed architecture.

Inlet air temperature and humidity sensors 109, 111 measure intake air temperature and humidity. It will be appreciated that these sensors 109, 111 could also be arranged in other suitable positions of the induction system 104. An air charge temperature sensor 123 measures ACT at an outlet of the throttle valve 122. An EGRC outlet temperature sensor 155 measures a temperature of EGR at an outlet of the EGRC 154. The controller 156 includes a barometric pressure sensor 158 that measures barometric pressure. It will be appreciated that the barometric sensor 158 could be external to the controller 156. An EGR valve delta pressure sensor 160 is disposed proximate to the EGR valve 150 and measures a delta pressure across the EGR valve 150. A dP valve outlet pressure sensor 162 measures a pressure at an outlet of the dP valve 110.

This dP valve outlet pressure also corresponds to inlet pressures of the compressors 116a, 116b. Lastly, exhaust gas concentration sensors 164a, 164b measure exhaust gas concentration. In one exemplary implementation, the exhaust gas concentration sensors 164a, 164b are WRO2 sensors configured to measure an air/fuel ratio (FA) of the exhaust gas. It will be appreciated that the engine system 101 could include other suitable sensors, such as an exhaust gas or back pressure sensor (not shown). All of these sensors provide their measurements to the controller 156, e.g., via a controller area network (CAN). The controller 156 is also configured to implement at least a portion of the techniques of the present disclosure, which are now described in greater detail.

The following discussion supports or proves the calibrations presented herein and discussed in greater detail below with respect to FIG. 2. First, a partial pressure of water vapor in ambient air at the compressor inlet is calculated using the following equation:

$$P_{pp,H_2O} = \frac{P_{CompSat} \times \phi_{rel}}{100}, \quad (1)$$

where $P_{compSat}$ is f ($T_{ambient}$) or f ($T_{CompIn}$) depending on measurement availability and is calculated using the Tetens equation $$(P = 0.6107 8 e^{\left(\frac{17.269T}{T+237.3}\right)}),$$

where T is temperature in degrees Celsius and P is saturation vapor pressure in kilopascals, or kPa), and $\phi_{rel}$ is relative humidity percentage from humidity sensor 111.

Next, a mass fraction of water vapor in the ambient air at the compressor inlet is calculated using the partial pressure of water vapor (Equation 1) and the following equations:

$$\omega_{H_2O} = \frac{P_{pp,H_2O}}{P_{CompIn}}, \quad (2a)$$

where $\omega_{H_2O}$ is the molar fraction of water ($H_2O$) and $P_{CompIn}$ is the pressure at the compressor inlet, which could be modeled or measured by sensor 162;

$$M_{mix} = \omega_{H_2O} \cdot M_{H_2O} + (1-\omega_{H_2O}) \cdot M_{DA} \quad (2b),$$

where $M_{mix}$ is the molecular weight of the mixture, $M_{H_2O}$ is the molecular weight of water ($H_2O$) and equals 18.015 grams per mole (g/mol), and $M_{DA}$ is the molecular weight of dry air (DA) and equals 29 g/mol;

$$\chi_{H_2O} = \omega_{H_2O} \cdot \frac{M_{H_2O}}{M_{mix}}, \quad (3a)$$

where $X_{H_2O}$ is the mass fraction of water ($H_2O$); and $$\chi_{DA} = \omega_{H_2O} \cdot \frac{M_{H_2O}}{M_{mix}}, \quad (3b)$$

where $X_{DA}$ is the mass fraction of dry air (DA).

The total intake water vapor fraction at a current EGR level is then calculated using the following equations:

$$X_{egrH_2O} = X_{egr} \cdot X_{ExhH_2O}|_{t=t-1} \quad (4a),$$

where $X_{egrH_2O}$ is the mass fraction of water ($H_2O$) from EGR, $X_{egr}$ is the mass fraction of the EGR, and $X_{ExhH_2O}|_{t=t-1}$ is the previous mass fraction of water ($H_2O$) from the exhaust gas;

$$X_{InAirH_2O} = (1-X_{egr}) \cdot X_{H_2O} \quad (4b),$$

where $X_{InAirH_2O}$ is the mass fraction of water ($H_2O$) from air;

$$X_{IntH_2O} = X_{egrH_2O} + X_{InAirH_2O} \quad (5)$$

where $X_{IntH_2O}$ is the mass fraction of water ($H_2O$) in the induction system 104; and $$X_{IntDA} = 1 - X_{egr} - X_{InAirH_2O} \quad (6),$$

where $X_{IntDA}$ is the mass fraction of intake dry air because the intake gas is composed of EGR that includes water vapor and water vapor due to ambient humidity.

Next, a water vapor fraction resulting from combustion is calculated using the following equations:

$$\psi = \left( \frac{\frac{F}{A}}{\left(\frac{F}{A}\right)_{stoich}} \right), \quad (7a)$$

where $\psi$ is an equivalence ratio of the actual fuel/air ratio and a stoichiometric fuel/air ratio, which is used to determine the amount of water and dry air going into the engine creates;

$$X_{CombH_2O} = X_{\psi H_2O} \cdot (X_{IntDA} + X_{IntDA} \psi_{current}) \quad (7b),$$

where $X_{CombH_2O}$ is a combined fraction of water ($H_2O$) for dry air flow and fuel flow for the current fuel/air ratio and $X_{\psi H_2O} = f(\psi)$; and $$X_{ExhH_2O} = X_{CombH_2O} \quad (8),$$

where $X_{ExhH_2O}$ is the exhaust mass fraction of water ($H_2O$), using Equation 5 and Equation 7b.

A dew point for a particular EGR fraction is then calculatable using the following equations:

$$X_{TotH_2O_{loop}} = X_{ExhH_2O} \cdot X_{EGR_{loop}} + (1 - X_{EGR_{loop}}) \cdot X_{H_2O}, \quad (9)$$

where $$X_{TotH_2O_{loop}}$$

is a mass fraction of water ($H_2O$) in the EGR loop;

$$\omega_{H_2O_{loop}} = \frac{X_{TotH_2O_{loop}} \cdot M_{DA}}{X_{TotH_2O_{loop}} \cdot M_{DA} + (1 - X_{TotH_2O_{loop}}) \cdot M_{H_2O}}, \quad (10)$$

where $\omega_{H_2O}$ is a total molar fraction of the total water ($H_2O$) in the EGR loop;

$$P_{pp,H_2O_{loop}} = \omega_{H_2O_{loop}} \cdot P_{CACout} \quad (11)$$

obtained using Equation 2(a), where $P_{pp,H_2O_{loop}}$ is the partial pressure of water ($H_2O$) as estimated for a particular percentage EGR loop and then substituted for the saturation pressure of water ($H_2O$) in the inverse of Tetens equation $$(P = 0.61078 e^{\left(\frac{17.269 T}{T + 237.3}\right)}),$$

which is:

$$T_{dew} = \frac{238.3 \cdot \ln\left(\frac{P_{vsat}}{0.61078}\right)}{17.269 - \ln\left(\frac{P_{vsat}}{0.61078}\right)}). \quad (12)$$

Lastly, a saturated mass fraction for a current ACT for 100% relative humidity (RH) at the CAC outlet pressure is determinable using the following equations:

$$\omega_{H_2O\_at\_CAC} = \frac{P_{pp,H_2O} \times 100}{P_{CACout} \times 100}, \quad (13)$$

where $\omega_{H_2O\_at\_CAC}$ is the molar fraction of water vapor at 100% RH and using Tetens equation $$(P_{sat} = 0.61078 e^{\left(\frac{17.269 T}{T + 237.3}\right)});$$

$$M_{CAC} = \frac{\omega_{H_2O\_at\_CAC} \cdot M_{H_2O}}{\omega_{H_2O\_at\_CAC} \cdot M_{H_2O} + (1 - \omega_{H_2O\_at\_CAC}) \cdot M_{DA}}, \quad (14)$$

where $M_{CAC}$ is the mass fraction of water vapor at the CAC outlet using Equation 2b.

If the ACT is less than the CAC dew point, then the total mass fraction of water vapor in the air charge will be greater than this saturated mass fraction $M_{CAC}$. The CAC dew point represents a CAC temperature below which water vapor begins to condense and dew (water droplets) can form. This fraction, $M_{CAC}$, is the subtracted from the mass fraction of total water (H2O) in the EGR loop $$\left( X_{TotH_2O_{loop}} \right)$$

to determine an excess fraction of water vapor that will condensate into liquid form:

Condensate Produced (g/s)=Total Air Port Flow $$\left( X_{TotH_2O_{loop}} - M_{CAC} \right).$$

From fluid dynamics theory, it is known that some of the condensate that is formed on the CAC surface will get ingested into the engine 102. This was experimentally determined through tests and a calibration is established to characterize blow off fraction as a function of air velocity.

Consequently, it was also determined that once a certain level of condensate accumulation has been reached for a given velocity, the accumulation level of condensate (i.e., condensate produced—condensate ingested) remains constant, unless the condensate is subjected to a higher or lower air velocity. This was also experimentally determined through tests and a calibration is established to characterize capacity as a function of air velocity. The fraction that is blown off (ingested into the engine 102) is a function of the gas velocity. There is a minimum velocity below which all of the excess water drains off and none gets blown off. FIGS. 3A-3D illustrate example plots showing this minimum velocity.

Figure 2A:
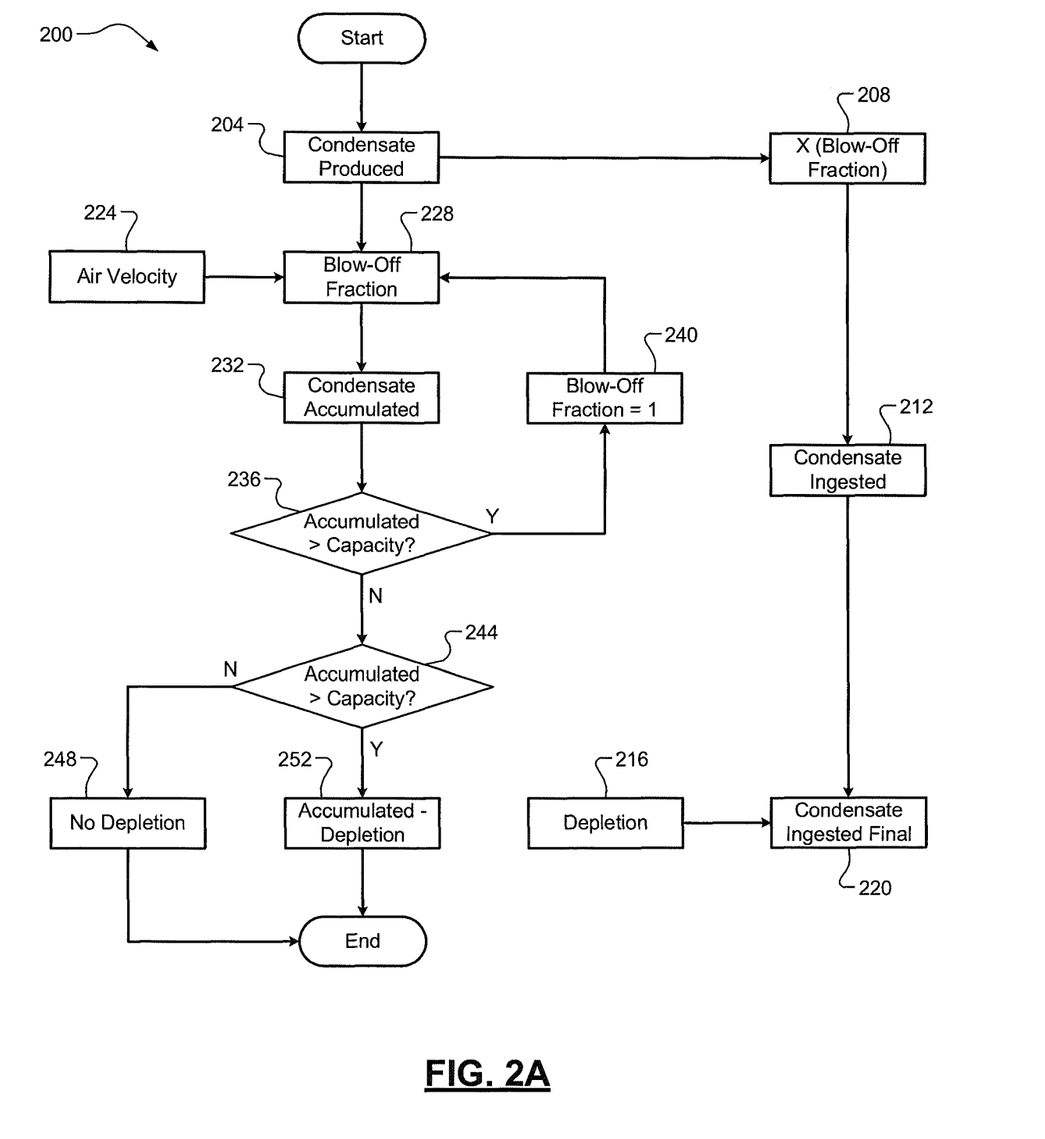
FIGS. 2A-2B are flow diagrams of example methods of determining condensate accumulation and depletion and target air charge temperature and/or target EGR control in a turbocharged engine having an LPCEGR system according to the principles of the present disclosure.
Figure 2B:
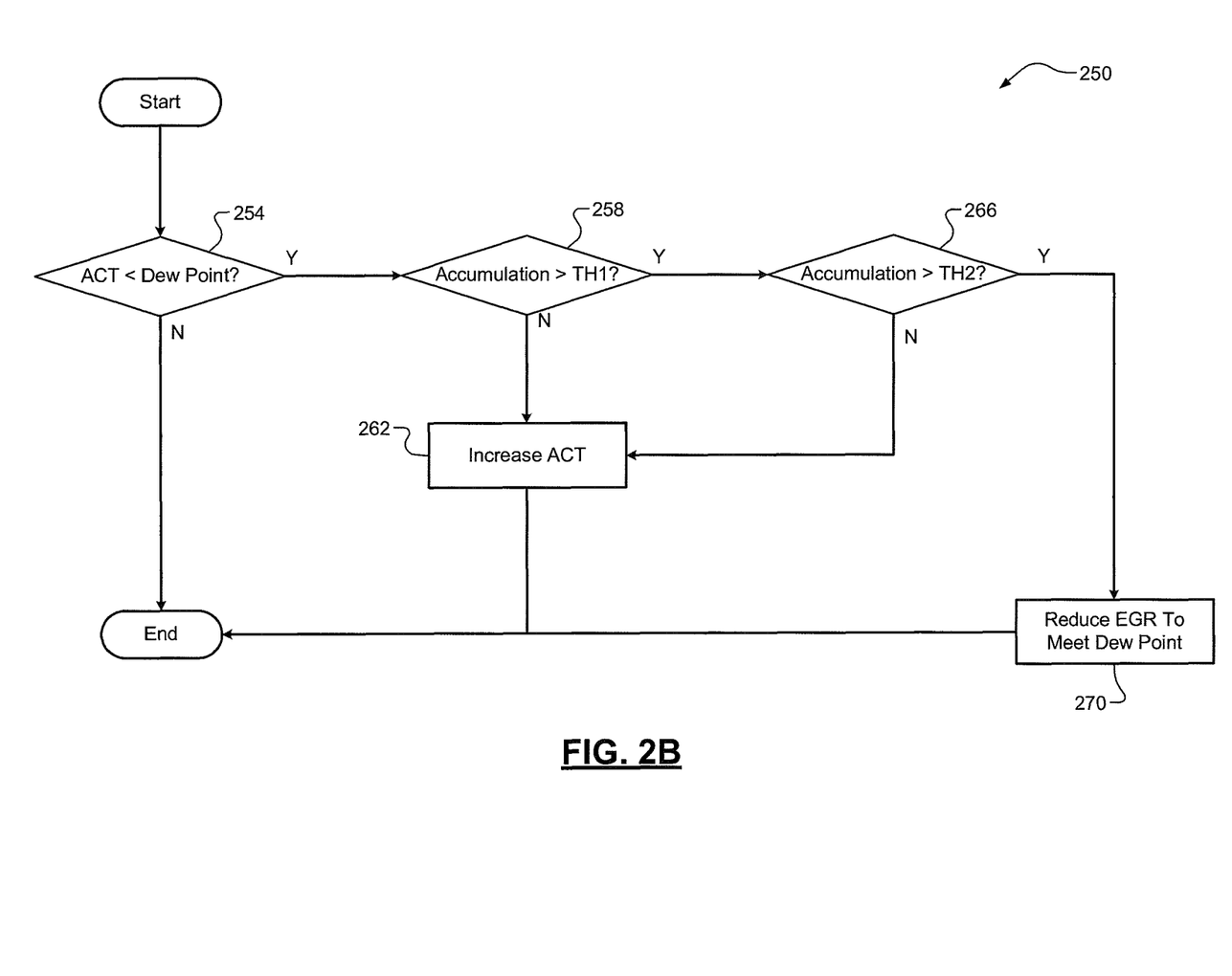
Figure 3A:
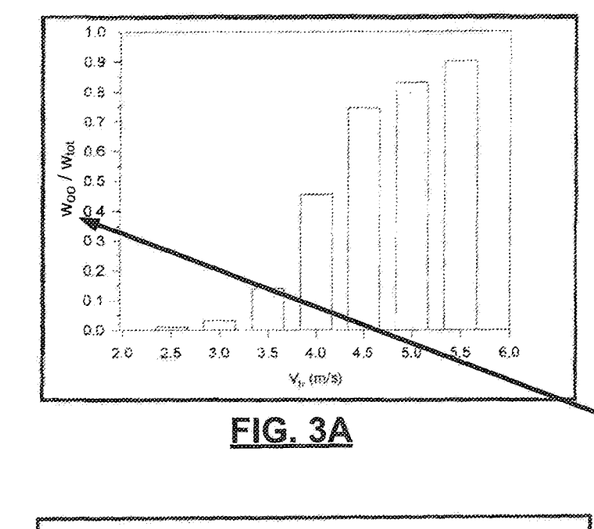
FIGS. 3A-3D are plots of example minimum air flow velocities at which condensate blow off does not occur according to the principles of the present disclosure.
Figure 3B:
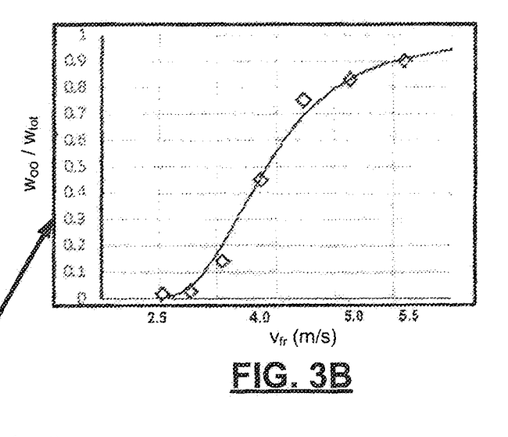
Figure 3C:
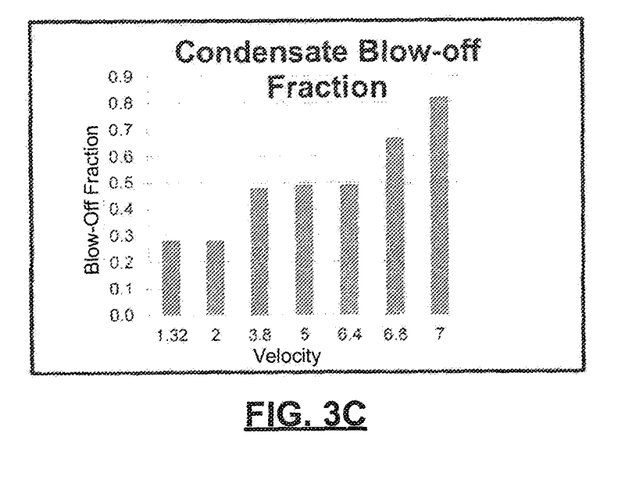
Figure 3D:
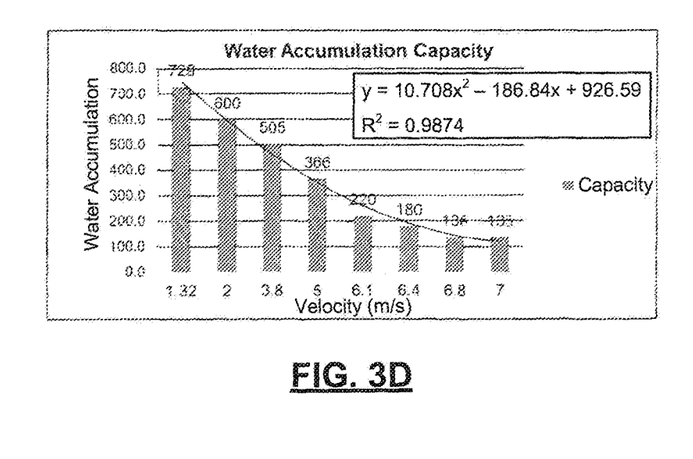

Referring now to FIGS. 2A-2B, flow diagrams of methods 200, 250 for determining condensation accumulation and depletion and for subsequent target ACT and/or target EGR control in a turbocharged engine having an LPCEGR system are illustrated. For explanatory purposes, this method 200 will refer to the components of the engine 102 of FIG. 1, but it will be appreciated that this method 200 could be applicable to any engine system having an LPCEGR system. In general, this method 200 calculates a condensate production (e.g., grams), condensate accumulation (e.g., grams), and condensate depletion (e.g., grams) based on a calibration using air velocity, blow off fraction, and capacity of condensate accumulation. Based on condensate accumulation, a target ACT and/or a target EGR is chosen to prevent or maintain desirable levels of condensate accumulation in the CAC 124.

Referring now to FIG. 2A, at 204, the controller 156 determines the condensate produced. In a depletion path, at 208, the controller 156 multiplies the condensate produced by the blow off fraction to determine the condensate ingested at 212. The sum of the condensate ingested and the condensate depleted (e.g., a negative value) from 216 results in the final amount of condensate ingested at 220. In an accumulation path, at 224, the controller 156 determines the air velocity, which, along with the condensate produced from 204 and the blow off fraction at 228, are used to determine the condensate accumulated at 232. At 236, the controller 156 determines whether the accumulated condensate exceeds the capacity. When true, the blow off fraction is set to 1 (100%) at 240 (e.g., for 208 and 228). When the condensate accumulation at 244 remains greater than the capacity, no depletion is determined at 248 and the method 200 ends. Otherwise, the depletion is subtracted from the accumulated condensate at 252 and the method 200 ends.

Referring now to FIG. 2B, at 254, the controller 156 determines whether the ACT is less than the dew point temperature. When true, the method 250 ends. Otherwise, the method 250 proceeds to 258 where the controller 156 determines whether the condensate accumulation is greater than a first calibratable threshold. When false, the controller 156 increases the target ACT at 262 and the method 250 then ends. Otherwise, the method 250 proceeds to 266 where the controller 156 determines whether the condensate accumulation is greater than a second, higher calibratable threshold. When false, the method 250 proceeds to 266. Otherwise, the method 250 proceeds to 270 where the controller 156 reduces the target EGR to meet the calculated dew point (i.e., the ACT exceeds the calculated dew point) and the method 250 then ends.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a turbocharged engine having a low pressure cooled exhaust gas recirculation (LPCEGR) system and an induction system with a charge air cooler (CAC), the control system comprising:
    a set of one or more sensors configured to measure humidity and temperature of a mixture of (i) air drawn into the induction system and (ii) exhaust gas produced by the engine that is cooled and recirculated by the LPCEGR system back into the induction system; and
    a controller configured to:
        determine a dew point of the CAC based on the air/exhaust gas mixture humidity and temperature; and
        when the air/exhaust gas mixture temperature is less than the CAC dew point:
            determine a condensate accumulation in the CAC,
            when the CAC condensate accumulation does not satisfy a set of one or more thresholds, increase the air/exhaust gas mixture temperature, and
            when the CAC condensate accumulation satisfies the set of one or more thresholds, decrease an amount of the exhaust gas that is cooled and recirculated by the LPCEGR system until the air/exhaust gas mixture temperature meets the CAC dew point.

2. The control system of claim 1, wherein the controller is configured to determine the CAC dew point by:
    determining a partial pressure of water vapor at a turbocharger compressor inlet;
    determining a mass fraction of water vapor at the turbocharger compressor inlet based on the water vapor partial pressure;
    determining a total intake water vapor fraction at a current EGR fraction based on the water vapor mass fraction at the turbocharger compressor inlet;
    determining a water vapor fraction resulting from combustion based on the total intake water vapor fraction at the current EGR fraction; and
    determining the CAC dew point based on the water vapor fraction resulting from combustion.

3. The control system of claim 2, wherein the controller is further configured to determine a condensate production in the CAC and a CAC condensate depletion from the CAC based on (i) a velocity of the air/exhaust gas mixture, (ii) a blow off fraction indicative of a portion of the CAC condensate production that is depleted at a given air/exhaust gas mixture velocity, and (iii) capacity for condensate accumulation in the CAC.

4. The control system of claim 3, wherein the controller is configured to determine the CAC condensate production by subtracting a saturated mass fraction of water vapor at the CAC the total intake water vapor fraction at the current EGR fraction.

5. The control system of claim 3, wherein the controller is configured to determine the CAC condensate accumulation by subtracting the CAC condensate depletion from the CAC condensate production.

6. The control system of claim 5, wherein the controller is further configured to:
    set the blow off fraction equal to one when the CAC condensate accumulation exceeds the CAC condensate accumulation capacity;

determine the CAC condensate depletion to be zero when the CAC condensate accumulation remains in excess of the CAC condensate accumulation capacity; and adjust the CAC condensate accumulation by subtracting the CAC condensate depletion from the CAC condensate accumulation when the CAC condensate accumulation falls below the CAC condensate accumulation capacity.

7. The control system of claim 1, wherein the CAC does not have a deflector shield or a drain plug for preventing or discarding at least some of the CAC condensate accumulation.

8. The control system of claim 1, wherein the engine is a twin-turbocharged six cylinder engine.

9. A method of controlling ingestion of water vapor into a turbocharged engine having a low pressure cooled exhaust gas recirculation (LPCEGR) system and an induction system with a charge air cooler (CAC), the method comprising:

receiving, by a controller and from a set of one or more sensors, measured humidity and temperature of a mixture of (i) air drawn into the induction system and (ii) exhaust gas produced by the engine that is cooled and recirculated by the LPCEGR system back into the induction system;

determining, by the controller, a dew point of the CAC based on the air/exhaust gas mixture humidity and temperature; and when the air/exhaust gas mixture temperature is less than the CAC dew point:

determining, by the controller, a condensate accumulation in the CAC, when the CAC condensate accumulation does not satisfy a set of one or more thresholds, increasing, by the controller, the air/exhaust gas mixture temperature, and when the CAC condensate accumulation satisfies the set of one or more thresholds, decreasing, by the controller, an amount of the exhaust gas that is cooled and recirculated by the LPCEGR system until the air/exhaust gas mixture temperature meets the CAC dew point.

10. The method of claim 9, wherein determining the CAC dew point comprises:

determining a partial pressure of water vapor at a turbocharger compressor inlet;

determining a mass fraction of water vapor at the turbocharger compressor inlet based on the water vapor partial pressure;

determining a total intake water vapor fraction at a current EGR fraction based on the water vapor mass fraction at the turbocharger compressor inlet;

determining a water vapor fraction resulting from combustion based on the total intake water vapor fraction at the current EGR fraction; and determining the CAC dew point based on the water vapor fraction resulting from combustion.

11. The method of claim 10, further comprising determining, by the controller, a condensate production in the CAC and a CAC condensate depletion from the CAC based on (i) a velocity of the air/exhaust gas mixture, (ii) a blow off fraction indicative of a portion of the CAC condensate production that is depleted at a given air/exhaust gas mixture velocity, and (iii) capacity for condensate accumulation in the CAC.

12. The method of claim 11, wherein determining the CAC condensate production comprises subtracting a saturated mass fraction of water vapor at the CAC the total intake water vapor fraction at the current EGR fraction.

13. The method of claim 11, wherein determining the CAC condensate accumulation comprises subtracting the CAC condensate depletion from the CAC condensate production.

14. The method of claim 13, further comprising:

set the blow off fraction equal to one when the CAC condensate accumulation exceeds the CAC condensate accumulation capacity;

determine the CAC condensate depletion to be zero when the CAC condensate accumulation remains in excess of the CAC condensate accumulation capacity; and adjust the CAC condensate accumulation by subtracting the CAC condensate depletion from the CAC condensate accumulation when the CAC condensate accumulation falls below the CAC condensate accumulation capacity.

15. The method of claim 9, wherein the CAC does not have a deflector shield or a drain plug for preventing or discarding at least some of the CAC condensate accumulation.

16. The method of claim 9, wherein the engine is a twin-turbocharged six cylinder engine.

* * * * *